UNITED STATES PATENT OFFICE.

JAMES M. HERRON, OF EAST ORANGE, NEW JERSEY, ASSIGNOR, BY MESNE ASSIGNMENTS, TO CEYLON COCOA & COFFEE COMPANY, A CORPORATION OF NEW YORK.

COFFEE PREPARATION AND PROCESS OF MAKING SAME.

No. 893,073.  Specification of Letters Patent.  Patented July 14, 1908.

Application filed December 21, 1905. Serial No. 292,813.

*To all whom it may concern:*

Be it known that I, JAMES M. HERRON, a citizen of the United States, and residing in Hyde Park, East Orange, Essex county, New Jersey, have invented a new and useful Coffee Preparation and Process of Making Same; and in order that others skilled in the art may understand and practice my invention I give the following specification.

My invention relates to coffee preparations and has for its object to produce a preparation of coffee in a form readily available for the various uses for which coffee is ordinarily employed, and particularly adapted for the use of caterers, confectioners, pastry makers and the like.

Heretofore, when caterers, confectioners, pastry makers and others desire to employ coffee as a flavoring, icing or ingredient in their products, it has been necessary to prepare a decoction or infusion of the roasted and ground coffee berries in boiling water, and the liquor so obtained has been added to or incorporated with the various products made. This process of obtaining coffee for the uses above mentioned is cumbrous and involves expenditure of considerable skill as well as time, since the flavor of the coffee and the flavor of the products depends largely upon the skilful and proper making of the decoction or infusion.

My invention is designed to obviate this preliminary process of obtaining coffee in the condition required for the uses mentioned, by producing coffee in a form in which it may be directly added to the products of caterers, confectioners and others and the best results obtained.

According to my invention, I produce coffee in the form of tablets or cakes or paste which is readily soluble in water or reducible by rubbing or a slight increase of temperature to a fluid readily applied to and miscible with the ingredients of confectioners, caterers and other similar products.

A further feature of my invention is the production of a coffee preparation from which a superior quality of the liquid may be made by the mere addition of water, such beverage being entirely free from grounds or sediment and being more wholesome for use and consumption.

In carrying out my invention, I take a suitable quantity of roasted and ground coffee and make a fluid extract thereof by treating the same with water sufficient to cover it for a period of time sufficient to extract the aroma or flavor of the coffee. I have found that a period of from four to five hours is satisfactory for this purpose. Preferably, the water should be warm, but not boiling. After the extraction has been made, the liquid is drawn off and the coffee is pressed to remove the remaining liquid or extract. The object of this is to employ as little fluid as possible in order to reduce the time and labor of subsequent desiccation or evaporation. The liquor or coffee extract so obtained is absorbed into a suitable quantity of raw or unroasted cocoa nibs by immersing the nibs in a quantity of the coffee liquid or extract of coffee sufficient to cover the same and insuring their saturation with the extract. The mass is then placed in a desiccator and subjected to desiccation by the application of moderate heat in a vacuum or under reduced pressure for a sufficient period of time until the mass becomes dry. Care should be taken that the heat applied is not sufficient to roast the cocoa nibs. By raw cocoa nibs, I mean cracked or broken unroasted cocoa beans freed from shells.

Preferably I use "ripe" beans for the purpose. After the mass has been desiccated for the period described and the liquid thereby removed, the cocoa nibs having the coffee extract absorbed therein are removed from the desiccator and ground to a paste or semi liquid consistency and run into molds to form cakes or tablets of the desired size.

By my invention, I obtain an improved coffee preparation in a readily soluble form, and from which coffee liquor or fluid can be readily obtained by dissolving in water. Since the preparation so made is soluble, no grounds are produced as is the case when coffee is made in the ordinary way, and the coffee liquid is readily and completely miscible with the ingredients used by confectioners, caterers, pastry makers and the like in making their products.

An important feature of the invention is the use of raw or unroasted cocoa beans. These do not impair the flavor of the coffee; and the best result is obtained where ripe cocoa beans are employed, for the reason that with beans or nibs of this character the flavor of the preparation is of a higher character or quality. Satisfactory results may be obtained, however, when the ordinary raw cocoa beans containing both ripe and unripe beans are employed.

Having thus described my invention and the manner of performing the same, what I claim and desire to secure by Letters Patent is:

1. The process of making a coffee preparation which consists in extracting roasted and ground coffee with water, immersing raw, ripe cocoa beans therein to absorb said extract, drying the beans so treated and grinding the same to a paste.

2. The herein described product, consisting of a cake or tablet having the aroma and flavor of coffee, said cake or tablet composed of ground raw cocoa beans saturated and impregnated with an extract of coffee, soluble in water and reducible to a fluid or paste upon slight increase of temperature.

JAMES M. HERRON.

Witnesses:
WILLIAM P. HAMMOND,
H. C. WORKMAN.